Nov. 21, 1961  M. J. MARTZ  3,009,589
BOAT TRAILER
Filed Oct. 21, 1957  3 Sheets-Sheet 1
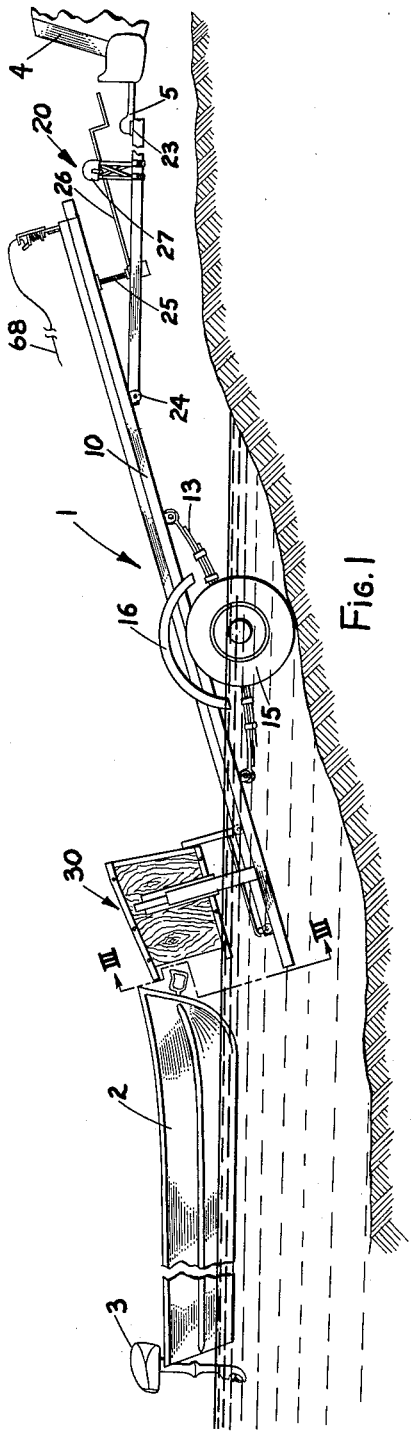
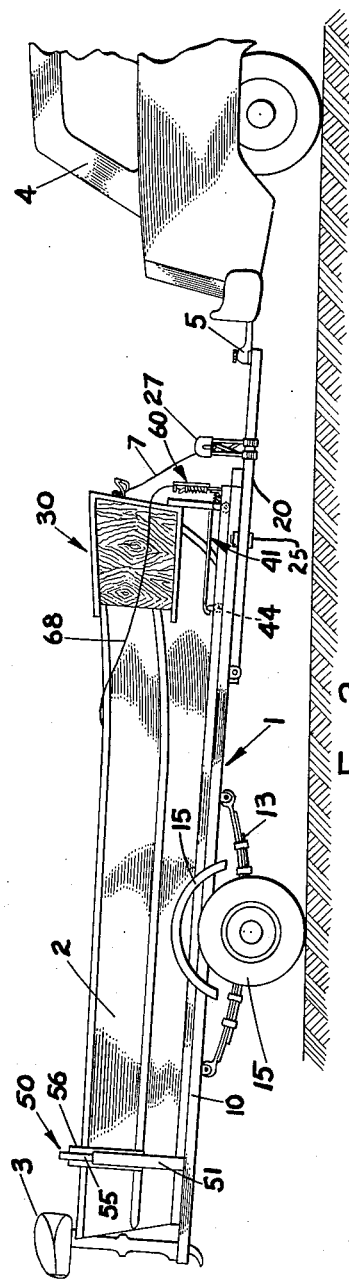
INVENTOR.
MARION J. MARTZ
BY
*Price and Heneveld*
ATTORNEYS Nov. 21, 1961    M. J. MARTZ    3,009,589
BOAT TRAILER Filed Oct. 21, 1957    3 Sheets—Sheet 2

INVENTOR.
MARION J. MARTZ
BY
ATTORNEYS

Nov. 21, 1961 M. J. MARTZ 3,009,589
BOAT TRAILER
Filed Oct. 21, 1957 3 Sheets-Sheet 3

INVENTOR.
MARION J. MARTZ
BY
ATTORNEYS

United States Patent Office 3,009,589
Patented Nov. 21, 1961

3,009,589
BOAT TRAILER
Marion J. Martz, 201 James St., Scottville, Mich.
Filed Oct. 21, 1957, Ser. No. 691,219
7 Claims. (Cl. 214—84)

This invention relates to a boat launching trailer and more particularly to a trailer having a novel loading and launching mechanism.

Recently, boating has become an immensely popular sport. At one time, boating was limited to those owning lake frontage or renting space in a boat livery. In recent years however, comparatively lightweight trailers have been developed on which the boat is carried and stored. Great strides have been taken in reducing the difficulty of launching and loading the boats from such trailers. As a result, the owner of such equipment carries his boat to the lake on each occasion of use. The boat is launched from the trailer, used, and then loaded again on the trailer after its use. This increased popularity of boating has developed a need for a trailer requiring the minimum amount of effort for boat launching and loading.

Although great efforts and some success has been made in accomplishing this end, no suitable solution has yet been found. It is still quite difficult to load and launch boats from conventional trailers. Frequently, it requires the operator to jump out of the boat into the water which obviously has its disadvantages. Further, many trailers require two men to load the boat on the trailer.

An object of this invention is to eliminate these disadvantages and difficulties.

Another object of this invention is to provide a trailer construction by which the operator can easily launch and load a boat by the boats own motor power.

Still another object of this invention is to provide a boat launching and loading trailer by which the boat is more easily and properly positioned on the trailer.

Other and further objects and novel features of this invention will become apparent from reading the following description made in conjunction with the accompanying drawings, wherein:

FIG. 1 is a side elevational view of the trailer in position for loading a boat thereon.

FIG. 2 is a side elevational view of the trailer with the boat loaded.

Figure 3:
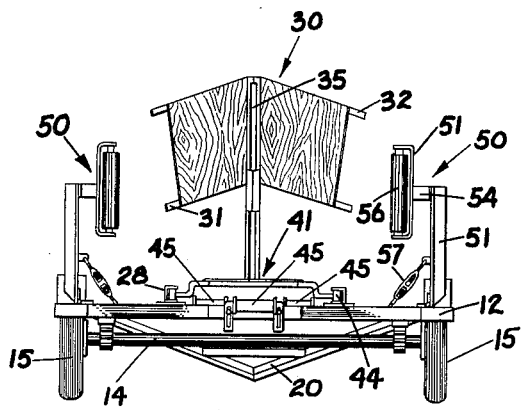
FIG. 3 is a rear elevational view of the trailer taken along the plane III—III of FIG. 1.

Briefly this invention relates to a boat launching trailer having a frame with track means mounted longitudinally on it and extending from the front to the rear. Riding on the track means is a giude carriage shaped to receive the bow of a boat. This carriage is adapted to ride the entire length of the frame. Between the track is a conveying means comprising a plurality of rollers for movably supporting the boat as it is being moved on and off the trailer. These rollers are engaged by the keel of the boat as is conventional in several types of trailers. With this apparatus, the carriage is moved to the rear of the trailer which is slightly submerged under the water. When launching a boat it slides into and is automatically attached to the carriage which is pushed to the front of the trailer by the motor of the motor boat. The carriage guides the boat and centers it on the frame. Thus the boat by its own motor power is permitted to be loaded on the trailer with a minimum of effort and trouble.

Referring specifically to the drawings, reference numeral 1 designates the trailer on which the boat 2 is carried as illustrated by FIG. 2. The boat has a motor 3 at its stern for propelling it in the lake or other body of water. Normally the trailer is used for carrying the boat to various lakes or streams, the motor 3 being mounted on the boat at all times regardless of whether it's in the water or not. The trailer is towed by the car 4 having a trailer hitch 5 on its rear bumper.

Figure 7:
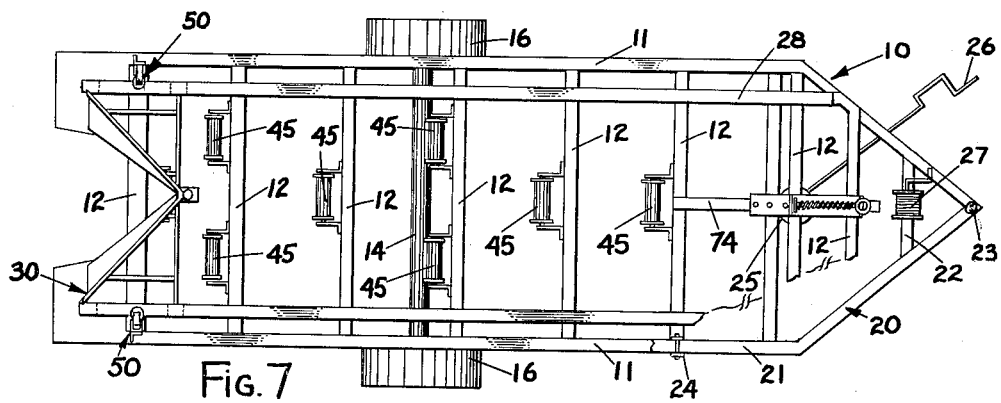
FIG. 7 is a plan view of the trailer partially cut away to show the tongue arrangement.

The trailer 1 includes the frame 10 having the longitudinal support members 11 and the cross bars 12 (FIG. 7). The frame 10 is supported by the leaf springs 13 on the axle 14 of the wheels 15. The wheels are covered by the fenders 16. Except for certain minor changes, this construction is quite old.

Pivotally secured to the underside of the frame at the front is the tongue 20. This tongue has the side members 21 and the cross bars 22. The side members 21 converging at the front where the hitch ball 23 is located. The tongue 20 is adapted for pivotal movement about hinges 24 with respect to the frame 10. The extent of this pivotal movement is regulated by the jack 25 attached to the frame and tongue and actuated by the hand crank 26. This consruction controls the relative angle of inclination of a trailer frame with respect to the normal horizontal position. Mounted on the front cross bar 22 is a winch 27 provided for the purpose of pulling (if necessary) and securing the boat on the trailer. I prefer that the motor of the boat itself be used to load the boat since it does not require manual operation and leaving the boat.

Extending lengthwise of the frame 10 are the tracks 28 spaced laterally from each other on the frame and attached thereto by welding or any other suitable means. These tracks are U-shaped channels laid on their sides for receiving the rollers 44 described hereinafter (FIG. 3). Riding on the tracks 28 is a guide carriage having a carriage frame 41 and a V-shaped boat receiving carriage member 30. The carriage member 30 is constructed of a bottom V-shaped frame member 31 and an upper V-shaped member 32 attached together at their vertex by the bars 33. Secured to these frame members are the side walls 34. This forms a structure which is adapted to receive the bow of a boat so that the two side walls 34 extend or wrap around the front sides of the bow. The bars 33 are spaced providing a vertical slot 35. The two vertical bars 33 can be a single V-shaped piece with a slot 35.

The bars 33 are secured by welding or otherwise to a tubular member 36 telescopically received by the tubular support member 37 which is mounted on the frame 41. Each of these members have openings 38 and 39, respectively (FIG. 5) for receiving a pin 40 when one of the openings 38 is aligned with opening 39. This establishes the vertical position of the carriage member 30.

The carrier frame 41 has two steel support axles 42 and 43 having offset ends on which the wheels 44 are rotatably mounted. The ends of wheel support axles 42 and 43 are vertically offset for purposes of clearing the conveyor rollers 45 mounted on the cross bars 12 of the frame (FIGS. 3 and 7).

The conveying rollers 45 are provided for the purpose of conveying the boat onto the frame. The arrangements of these rollers are such that two pairs of laterally displaced rollers are provided at the rearward end of the frame on which twin keels of the certain boats ride. Single rollers are located on the centerline of the frame on which center keels ride.

Figure 4:
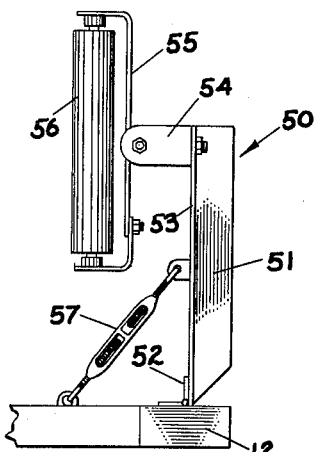
FIG. 4 is an enlarged, fragmentary view of the guide means located at the rear of the trailer frame.

Guide roller assemblies 50 are located near the end of the frame 10. They are supported by the rearward most cross bar 12. This assembly (FIG. 4) includes the upstanding vertical support member 51 hingedly secured to the cross bar 12 by the hinge 52. The support member is the channel bar having a flange 53 to which is attached the horizontal support member 54. Pivotally mounted on the horizontal support member 54 is the roller assembly including the U-shaped axle support 55 and the roller 56. The roller 56 is freely mounted for rotation in the U-shaped yoke 55 and the yoke in turn is pivotally mounted on the horizontal support member 54. The turn buckles 57 are secured between the upstanding support members 51 and the cross bars 12 permitting adjustment of the position of the upstanding support member 51 which permits the adjustment of the spacing between the two rollers on each side of the frame for different width boats. The guide assembly 50 is provided for engaging the side of the boat as it is driven onto the trailer to thus properly center it on the trailer.

At the front of the frame is an automatic catch means for automatically catching and securing the carriage at a position near the front. This automatic catch means 60 shown in detail by FIG. 5 includes an upstanding support member 61 having two flanges 62 and 63 vertically spaced one from the other and receiving the catch rod 64. This rod is biased downwardly by the springs 65 which bears against the plate 66 attached to the rod. The rod has an eyelet 67 on its top end to which a spring 68 is attached. The lower end of the rod 64 engages the hook 69 secured to the front end of the carrier frame 41 of the carriage assembly 30. This hook has a cam surface which when the carriage reaches the extreme front end of the frame cams the rod into hooked position. The catch is released by exerting a pull on spring 68, pulling the rod upwardly out of engagement with the hook 69.

Figure 5:
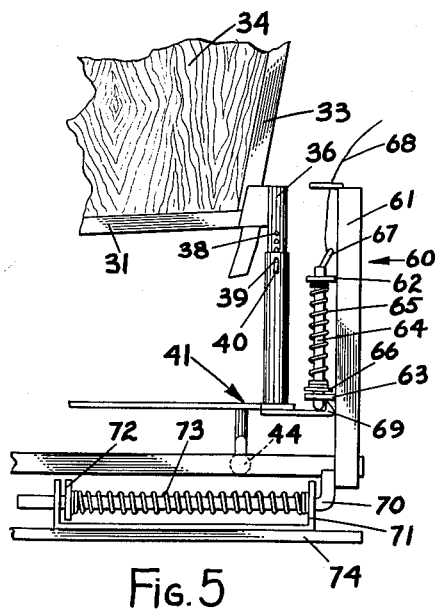
FIG. 5 is a fragmentary, enlarged view of the catch mechanism located at the front of the trailer frame.
Figure 6:
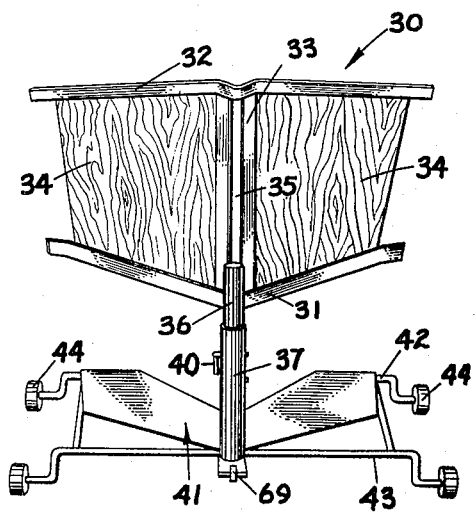
FIG. 6 is an oblique, front elevational view of the carriage forming a part of this invention.

A catch mechanism 60 is mounted on an anti-shock structure which includes the rod 70 extending through openings in the legs of the U-shaped yoke 71. Secured to the rod is the plate 72 against which the spring 73 bears. With this arrangement when the carriage strikes the upstanding member 60 the shock is absorbed by the spring as the rod 70 is moved to the right in the direction as shown by FIG. 5. The entire structure is secured to the plate 74 extending between the two foremost cross bars 12 of the frame.

Figures 8, 10:
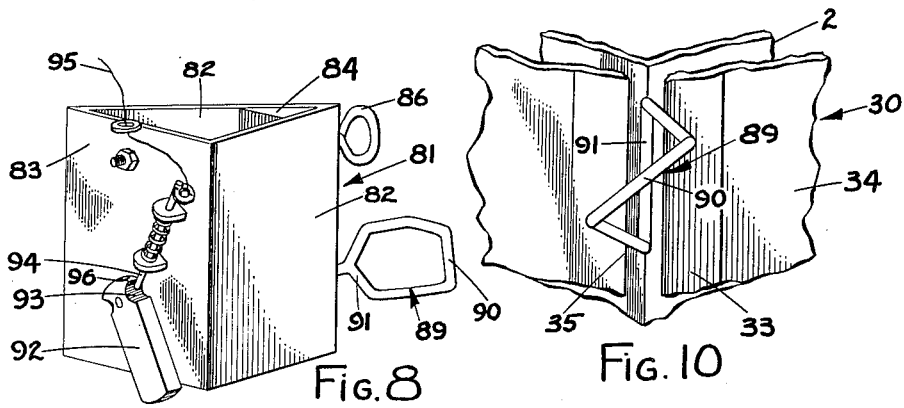
FIG. 8 is an oblique, side elevational view of the catch mechanism part which is adapted to be mounted in the bow of the boat.
FIG. 10 is a front elevational view of the catch mechanism for attaching the bow of the boat to the carriage looking in the direction of the arrows X—X of FIG. 9.

FIGS. 8–11 show a preferred automatic hitch mechanism for automatically attaching or securing the bow of a boat in the carriage 30. A port 81 of this hitch mechanism comprises a triangular mounting bracket having the sides or legs 82 and a base 83. Between the apex of the legs 83 is secured a reinforcement bar 84. Two horizontal but vertically spaced holes 85 and 87 (FIG. 11) are drilled through the apex and the base. A bolt 86 having an eye at one end is received by hole 85. In the lower hole 87 is rotatably mounted a rod 88 having a helically twisted square end 89 (FIGS. 9, 10, and 11) with a front end 90 arranged at an angle to the rearward end 91 (FIG. 10).

Attached to the opposite end of the square section 89 is a pendulum cam element 92 having a groove 93 receiving the cam follower pin 94. The cam follower pin in one position is biased into the groove 93 preventing the rod 88 from turning. The cam element 92 is a heavy pendulum which by its own weight will normally pivot downwardly to a vertical position. This results when a pull is exerted on the string 95 attached to the end of the cam follower 94 causing the cam follower to ride out of groove 93 and on the arcuate shaped surface 96. This is the normal position of a cam element 92 and cam follower 94, before the boat is secured to the carriage. In this position, the front end 90 of the square portion 89 is in a vertical position permitting it to enter into the vertical slot 35 of the carriage. Upon entering the slot a rod 88 is rotated, rotating the cam element 90 to the position shown in FIGS. 8 and 10. This secures square end 89 in the slot holding the bow of the boat in the carriage.

The hitch port 81 is secured in the very peak of the bow 6 of the boat 2. The eyebolt 86 and rod 88 extend through the peak of the bow 6 of the boat 2. This holds the entire assembly in the bow in the proper position.

*Operation*

The operation of this trailer is quite simple. In order to explain its entire operation from launching to loading, the loading operation will first be described.

Figure 9:
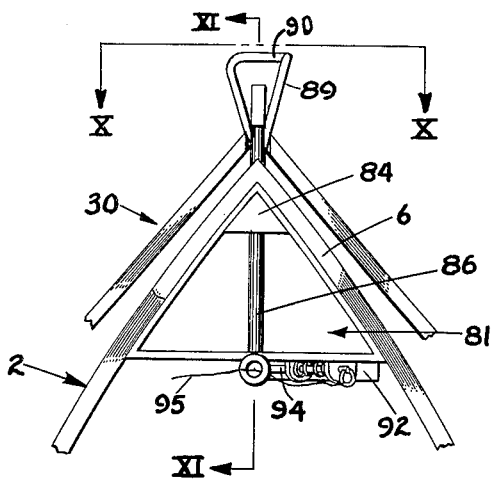
FIG. 9 is a fragmentary, plan view of the mechanism of FIG. 8, installed in the bow of a boat and engaging the carriage for securing the bow of the boat to the carriage.
Figure 11:
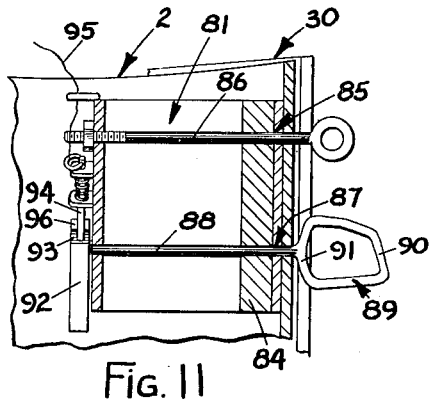
FIG. 11 is a side elevational, cross sectional view taken along the plane XI—XI of FIG. 9.

The boat is carried by the trailer which in turn is attached to the car 4 by the hitch 5 which fits over the hitch ball 23. The trailer is backed up into the water so that the wheels are in about 8 or 10 inches of water. Then the jack 25 is operated by handle 26 tilting the frame at approximately the position illustrated by FIG. 1. The cable 7, leading to the winch 27 is then detached from the eye of the bolt 86. The operator then sits in the boat and pulls on the cable or string 68. This pulls the rod 64 upwardly (FIG. 5) releasing it from the hook 69. Since the frame 10 is inclined the carriage rides downwardly on the wheels 44 with the boat which has its center keel riding on the center conveyor roller 45 and rear twin keels on rear pairs of rollers. The boat rides directly into the water and as the carriage approaches the rear end of the frame the operator pulls on the string 95 (FIGS. 8 and 9). This withdraws pin 94 permitting the cam element 92 to swing downwardly and the square end 89 to disengage from the elongated slot 35 of the carriage. The boat is thus permitted to separate from the carriage and the inertia of the boat carries it out into the water.

When the operator desires to load the boat on the trailer, the trailer is arranged in the same position shown by FIG. 1. The operator then merely runs the nose of the boat into the carriage. This causes the front end 90 of the square section 89 of the rod 88 to enter into the slot 35 of the carriage. The force of the boat caused by the motor 3 pushes the square end 89 into the opening 35 causing the rod 88 to rotate. This rotates the cam element 92 to a position as shown by FIG. 8 in which the position the cam follower pin 94 is biased into groove 93 locking the rod 88 in that position. This prevents the square end 88 from being withdrawn from the elongated slot 35 and thus secures the bow of the boat in the carriage.

The operation of the motor causes the carriage to be pushed upwardly on the tracks 28. The front of the boat then engages the first center roller 45 and the boat rides up on the rollers onto frame 10. If the boat has a twin keel at the rear end, these keels engage the pair of rollers 45 arranged on the cross bars 12 as shown by FIG. 7. As the boat rides upwardly on the rollers 45 the the sides of the boat engage the vertical rollers 56 of the guide mechanism 50. This causes the boat to be perfectly centered on the frame and properly positioned when the loading is completed. The operator continues to run the motor until the carriage reaches the extreme front end of the frame 10. At this position, the hook 69 cams under the rod 64 (FIG. 5) securing the carriage and boat to the front of the trailer. This prevents the carriage and boat from sliding back permitting the operator to shut off his motor. When the boat strikes the catch mechanism 60 at the front of the frame, the shock is absorbed by the spring 73. This operates by the rod 70 being pushed forwardly as the boat strikes the catch mechanism which force is absorbed by the spring mounted about the rod and bearing against the plate 72. The cable 7 on the winch 27 is secured to the eyelet of the bolt 85 and the boat is in secured position on the trailer.

It should be obvious from the above description that I have provided a trailer by which one individual can load a boat with ease. It does not require the operator to get out of the boat and push the boat onto the trailer. Furthermore, the boat is more properly loaded and can be easily unloaded.

Having described my invention it should become obvious that although I have shown and described a preferred form, alterations and modifications are possible within the broadest aspect. Therefore, unless specifically included by the express language of the claims, such modifications and alterations are intended to be covered.

I claim:

1. A boat launching trailer comprising a frame; track means mounted longitudinally on said frame; a guide carriage shaped to receive and releasably engage the bow of a boat riding on said track means; conveying means between said tracks for movably supporting a boat as it is being moved on and off said trailer; hitch means on said boat and on said carriage for automatically locking said boat to said carriage only after the bow of said boat is received by said guide carriage; catch means at the forward end of said trailer and on said guide carriage for automatically latching said guide carriage at a forward position on said trailer; releasing means for releasing said catch means; means for releasing said hitch means; said guide carriage being freely movable along said tracks in both forwardly and rearwardly directions longitudinally of said frame whereby a boat received by said guide carriage can be loaded on said trailer solely by its own motive power and can be unloaded by gravity.

2. A boat launching trailer comprising a frame; track means mounted longitudinally on said frame; a guide carriage shaped to receive and releasably engage the bow of a boat and riding on said track means; conveying means between said tracks for movably supporting a boat as it is being moved on and off said trailer and guide means mounted at the rear of said frame for centering the boat on the frame as the boat is moved on and off the trailer; hitch means on said boat and on said carriage for automatically locking said boat to said carriage only after the bow of said boat is received by said guide carriage; catch means at the forward end of said guide carriage for automatically latching said guide carriage at a forward position on said trailer; releasing means for releasing said catch means, means for releasing said hitch means, said guide carriage being freely movable along said tracks in both forwardly and rearwardly directions longitudinally of said frame whereby boat received by said guide carriage can be loaded on said trailer solely by its own motive power and can be unloaded by gravity.

3. A boat launching trailer comprising a frame; track means mounted longitudinally on said frame; a guide carriage shaped to receive and releasably engage the bow of a boat and riding on said track means; conveying means between said tracks for movably supporting a boat as it is being moved on and off said trailer and a pair of rollers mounted one on each side of the frame at the rear end thereof in substantially a vertical position for engaging the sides of the boat to center it on the frame as it is moved on and off the trailer; hitch means on said boat and on said carriage for automatically locking said boat to said carriage only after the bow of said boat is received by said guide carriage; catch means at the forward end of said trailer and on said guide carriage for automatically latching said guide carriage at a forward position on said trailer; releasing means for releasing said catch means, means for releasing said hitch means, said guide carriage being freely movable along said tracks in both forwardly and rearwardly directions longitudinally of said frame whereby boat received by said guide carriage can be loaded on said trailer solely by its own motive power and can be unloaded by gravity.

4. A boat launching trailer comprising a frame; track means mounted longitudinally on said frame; a guide carriage shaped to receive and releasably engage the bow of a boat and riding on said track means; roller and conveying means between said tracks for engagement by the keel of a boat for movably supporting a boat as it is being moved on and off said trailer; hitch means on said boat and on said carriage for automatically locking said boat to said carriage only after the bow of said boat is received by said guide carriage; catch means at the forward end of said trailer and on said guide carriage for automatically latching said guide carriage at a forward position on said trailer; releasing means for releasing said catch means, means for releasing said hitch means, said guide carriage being freely movable along said tracks in both forwardly and rearwardly directions longitudinally of said frame whereby boat received by said guide carriage can be loaded on said trailer solely by its own motive power and can be unloaded by gravity.

5. A boat launching trailer comprising a frame; track means mounted longitudinally on said frame; a guide carriage including an upstanding V-shaped structure adapted to receive and releasably engage the bow of a boat with the sides of the structure wrapped around said bow; and conveying means between said tracks for movably supporting a boat as it is being moved on and off said trailer; hitch means on said boat and on said carriage for automatically locking said boat to said carriage only after the bow of said boat is received by said guide carriage; catch means at the forward end of said trailer and on said guide carriage for automatically latching said guide carriage at a forward position on said trailer; releasing means for releasing said catch means, means for releasing said hitch means, said guide carriage being freely movable along said tracks in both forwardly and rearwardly directions longitudinally of said frame whereby boat received by said guide carriage can be loaded on said trailer solely by its own motive power and can be unloaded by gravity.

6. A boat launching trailer comprising a frame; track means mounted longitudinally on said frame; a guide carriage including an upstanding V-shaped structure adapted to receive and releasably engage the bow of a boat with the sides of the structure wrapped around said bow; and conveying means between said tracks for movably supporting a boat as it is being moved on and off said trailer; said V-shaped structure at its apex having a slot for receiving a hitch mechanism secured to the bow of a boat entering into said structure; hitch means on said boat and on said carriage for automatically locking said boat to said carriage only after the bow of said boat is received by said guide carriage; catch means at the forward end of said trailer and on said guide carriage for automatically latching said guide carriage at a forward position on said trailer; releasing means for releasing said catch means, means for releasing said hitch means, said guide carriage being freely movable along said tracks in both forwardly and rearwardly directions longitudinally of said frame whereby boat received by said guide carriage can be loaded on said trailer solely by its own motive power and can be unloaded by gravity.

7. A boat launching trailer comprising a frame; track means mounted longitudinally on said frame; a guide carriage including an upstanding V-shaped structure adapted to receive and releasably engage the bow of a boat with the sides of the structure wrapped around said bow; and conveying means between said tracks for movably supporting a boat as it is being moved on and off said trailer; said V-shaped structure at its apex having a slot for receiving a hitch mechanism secured to the bow of a boat entering into said structure; said hitch means including a helically twisted square which is rotated upon entering said slot to operate said hitch means, said hitch means on said boat and on said guide carriage automatically locking said boat to said guide carriage only after the bow of said boat is received by said guide carriage; catch means at the forward end of said trailer and on said guide carriage for automatically latching said guide carriage at a forward position on said trailer; releasing means for releasing said catch means, means for releasing said hitch means, said guide carriage being freely movable along said tracks in both forwardly and rearwardly directions longitudinally of said frame whereby a boat received by said guide carriage can be loaded on said trailer solely by its own motive power and can be unloaded by gravity.

References Cited in the file of this patent

UNITED STATES PATENTS

| | | |
|---|---|---|
| 2,558,418 | Brueckman | June 26, 1951 |
| 2,704,162 | Johnson | Mar. 15, 1955 |
| 2,761,577 | Lahman | Sept. 4, 1956 |
| 2,763,384 | Foster | Sept. 18, 1956 |
| 2,765,942 | Neimeir | Oct. 9, 1956 |
| 2,799,416 | Balko et al. | July 16, 1957 |
| 2,848,126 | Taylor | Aug. 19, 1958 |